April 21, 1931.  J. BORNSTEIN  1,801,715
WINDSHIELD WIPER
Filed Aug. 3, 1927   3 Sheets-Sheet 1
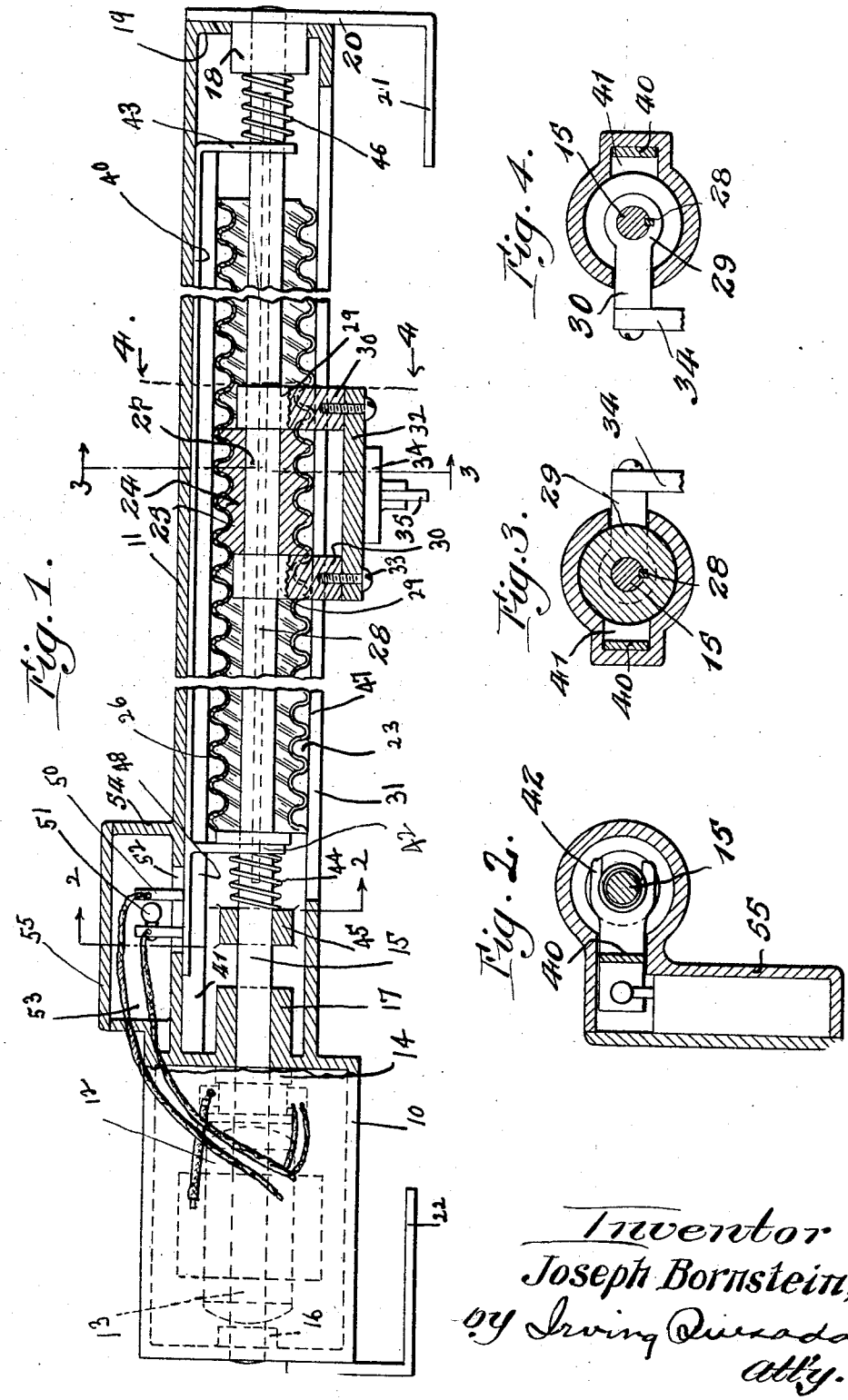
Inventor
Joseph Bornstein,
by Irving Quesada
atty.

April 21, 1931.  J. BORNSTEIN  1,801,715
WINDSHIELD WIPER
Filed Aug. 3, 1927   3 Sheets-Sheet 2
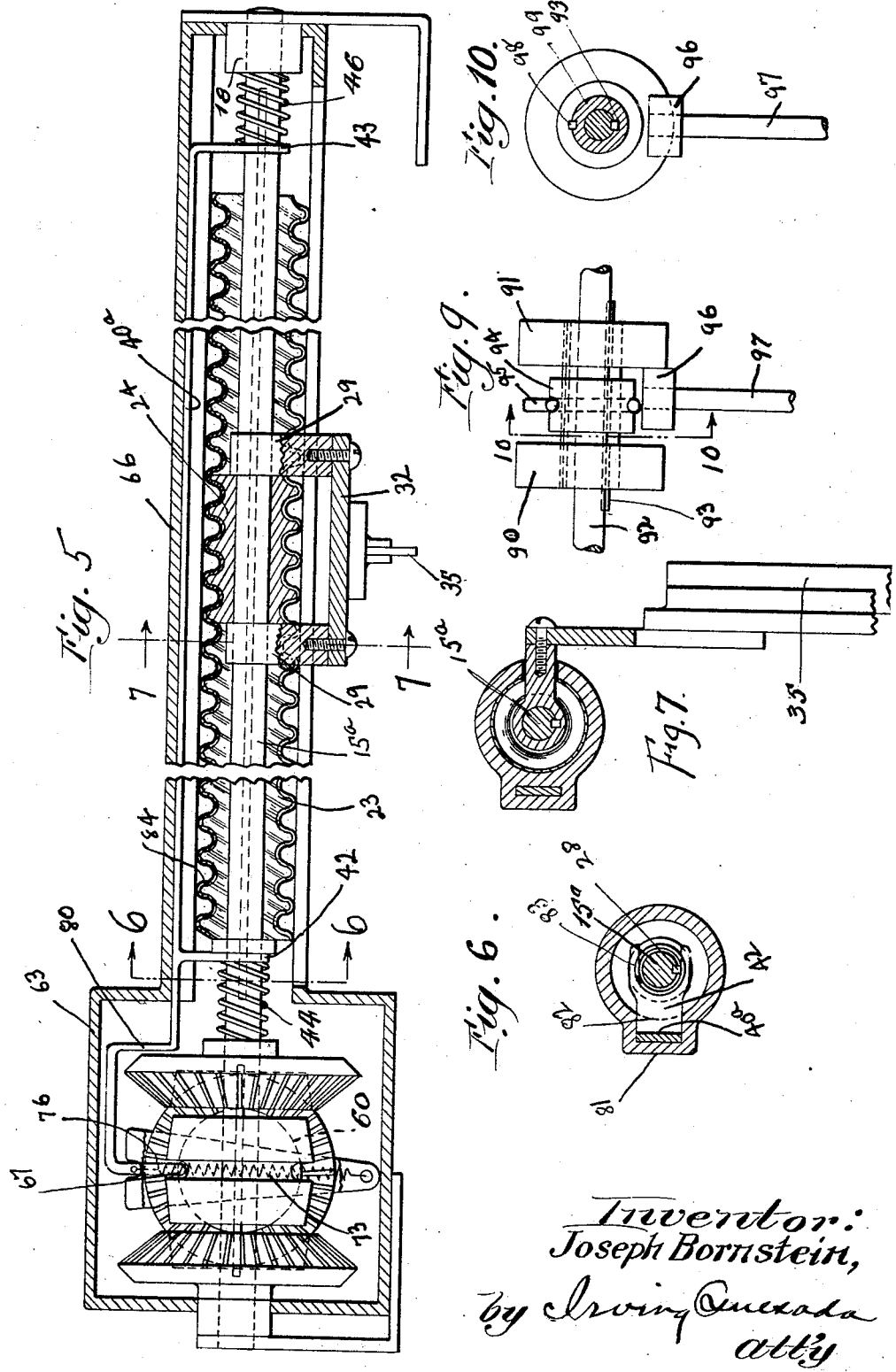

April 21, 1931.  J. BORNSTEIN  1,801,715
WINDSHIELD WIPER
Filed Aug. 3, 1927  3 Sheets-Sheet 3
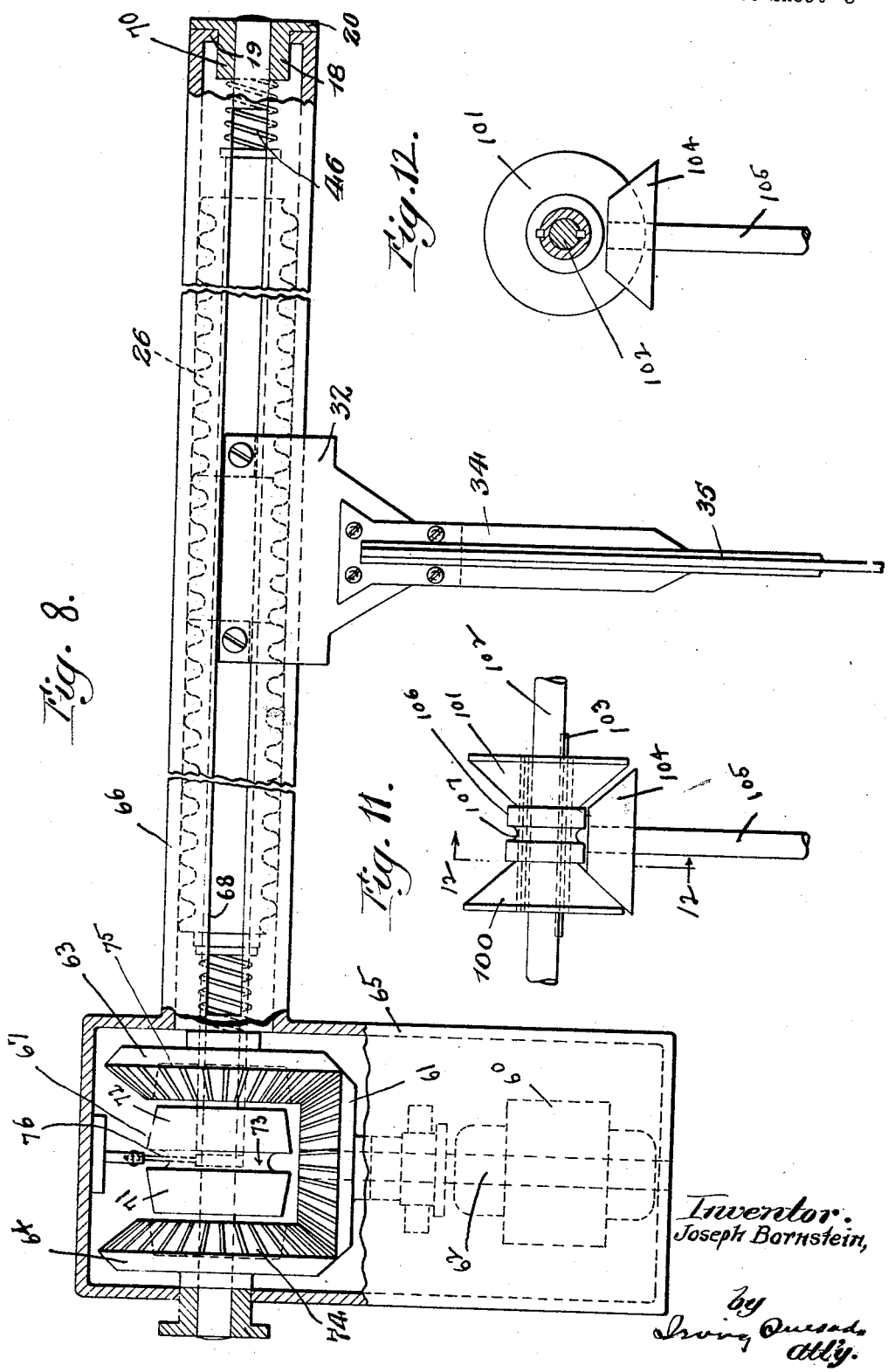
Inventor.
Joseph Bornstein,
by
Irving Quesada
Atty.

Patented Apr. 21, 1931

1,801,715

UNITED STATES PATENT OFFICE

JOSEPH BORNSTEIN, OF DORCHESTER, MASSACHUSETTS, ASSIGNOR, BY DIRECT AND MESNE ASSIGNMENTS, TO SOMBCO, INC., OF BOSTON, MASSACHUSETTS, A CORPORATION OF MASSACHUSETTS

WINDSHIELD WIPER

Application filed August 3, 1927. Serial No. 210,401.

This invention relates to wind shield cleaners.

An object of the invention is the provision of an automatic cleaner under the control of the operator of an automobile and in which the "squeegee" is given a rectilinear motion across the windshield thereby providing for a greater field of vision for the occupants of the vehicle.

Another object of the invention is the provision of a windshield wiper having a rectilinear motion on a reversible shaft, the motion being controlled by a nut revolving in threaded engagement with an internally threaded stationary sleeve, the nut cooperating with means at the limits of travel of the wiper for causing reversal of rotation of the shaft.

A further object of the invention is the provision of an operating mechanism for a squeegee of a windshield wiper to produce a rectilinear motion in which an externally threaded nut is revolved in mesh with an internally threaded stationary sleeve, collars being applied at opposite ends of the nut and connected together as a unit by a carrier for the wiper, the collars being adapted to cause reciprocation of a rod for controlling the direction of rotation of a shaft which revolves the nut.

Other objects and advantages will be apparent from the detailed description taken in connection with the drawings which disclose a preferred embodiment of the invention, and in which:

In the drawings:

Fig. 1 is a horizontal longitudinal section of the wiper constructed according to the principles of my invention.

Fig. 2 is a transverse vertical section taken along the line 2—2 of Fig. 1.

Fig. 3 is a transverse vertical section taken along the line 3—3 of Fig. 1.

Figure 4 is a vertical transverse sectional view taken on line 4—4 of Figure 1.

Fig. 5 is a horizontal longitudinal section of a modified form of the invention.

Fig. 6 is a transverse vertical section taken along the line 6—6 of Fig. 5.

Fig. 7 is a transverse vertical section taken along the line 7—7 of Fig. 5.

Fig. 8 is a view in elevation and partly in section of the form shown in Fig. 5.

Fig. 9 is a fragmentary plan view of a modified form of the reversing gearing shown in Fig. 5.

Fig. 10 is a transverse vertical section taken along the line 10—10 of Fig. 9.

Fig. 11 is a fragmentary view in elevation of another modified form of reversing gearing.

Fig. 12 is a transverse vertical section taken along the line 12—12 of Fig. 11.

Referring more particularly to the drawings, 10 designates a motor housing which is formed integrally with a housing 11 in which is mounted the mechanism for reciprocating the windshield wiper with a rectilinear motion across a windshield. The motor 12 is of the reversible type and is adapted to be reversed by a switch which will be presently described. A motor shaft 13 is connected at 14 in any approved manner with a drive shaft 15 for the windshield wiper, shaft 13 being mounted in bearings 16 in a housing 10, while shaft 15 is mounted in bearings 17 and 18. The bearing 18 is removable from the closed end 19 of the housing 11 and is provided with a flange 20, from which projects a securing flange 21 whereby the housing may be rigidly attached to the windshield. A flange 22 similar to the flange 21 is secured to the motor housing 10 and provides a second element for rigidly maintaining the motor housing and the housing 11 in position at one side of the windshield.

A sleeve 23 is rigidly mounted within the housing 11 and is maintained against rotation in any approved manner. Revolvably mounted in the sleeve 23 is a nut 24 in the form of a screw having threads 25 adapted to engage the internal threads 26 of the sleeve 23.

It will be noted that the shaft 15 extends longitudinally of the sleeve 23 and is received by a passage 27 in the nut 24. A key 28 carried by the shaft 15 is received within a slot in the nut 24 whereby rotation of the shaft will cause rotation of the nut, and due to the fact that the threads of the nut are in mesh with the stationary sleeve 23, said nut will be moved longitudinally of the sleeve and reversed as will be presently explained.

Blocks 29 are located upon opposite sides of the nut 24 and have projections 30 inserted through an elongated slot 31 in the front part of the housing 11. These lugs are connected together by a wiper carrier or vertically disposed platform 32 by means of screws 33. A wiper arm 34 is secured to the platform 32 upon which is mounted a squeegee 35. The squeegee is formed in any approved manner and is provided with the usual rubber member 36 adapted to be moved over one face of the windshield in close contact for removing water or snow, as the case may be.

A reciprocating rod 40 is mounted in a groove 41 and has depending arms or lugs 42 and 43 which are perforated to receive not only the shaft 15 but the key 28. A spring 44 embracing the inner end of the shaft 15 has one end in engagement with a bearing 45 for the shaft 15, said bearing being formed integrally with the housing 11, the other end of the spring is in engagement with the arm 42 and tends to move said arm to the right in Figure 1.

A coil spring 46 surrounds the outer end of the shaft 15 and has one end in engagement with the bearing 18 and the other end engaging the arm 43 and tends to move said arm towards the left.

The rod 40 carries a contact member 50 and 50ª respectively connected with wires 200 and 201 and adapted to engage the number 51 for alternately changing the circuit of the motor for reversing the motor and thereby reversing the rotation of the shaft 15.

The operation of the device shown in Figures 1 to 4 inclusive is as follows:

Wires connecting the contact members 50 and 51 with the motor 12 in such a manner that when the contacts are in engagement the motor is revolved in one direction, while when the contacts are moved away from each other, the circuit is reversed for the reversing of the motor.

As the shaft 15 revolves, the screw 24 is revolved in the internally threaded sleeve 23 and is moved in one direction, for instance to the left. As soon as the screw has moved to its limit of movement in this direction, the block 29 engages the arm 42 and forces said arm to the left against the tension of the spring 44 thereby carrying the rod 40 in the same direction and causing the contact 50 to move into engagement with contact 51. At this time the motor is reversed causing the shaft 15 to revolve in the opposite direction, whereby the screw 24 will change its direction of movement and follow a path towards the right. When the block 29 engages the arm 42, it will force the spring 46 under compression and move the rod 40 to the right, causing the contact 50 on said rod to be moved out of engagement with the contact 51, thereby causing a reversal of the motor 12.

At this time the shaft will be reversely rotated from its former direction and the nut 24 will travel towards the left, carrying the blocks 29 and the windshield wiper in the same direction. These operations are continued automatically until the curent is turned off from the motor 12.

Referring more particularly to Figures 5 to 12 inclusive, it will be seen that a modified form of the reversing means is disclosed, and in which a motor 60 is rotated in one direction continuously thereby rotating a gear 61 which is rigid with the shaft 62 of the motor. Gear 61 meshes with a gear 63 and a gear 64. The elements just described are contained within a housing 65 which is formed integrally with a housing 66, or these housings may be formed separately and connected together, as will be appreciated.

A double-acting clutch member 67 is slidable on a shaft 68 which has bearings at 69 and 70, the last mentioned bearing being removable from the outer end of the housing 66. The clutch member 67 has two frustoconical shaft sections 71 and 72 which are separated by an annular groove 73. Gear 64 has a socket 74 adapted to receive the section 71 of the clutch, while gear 63 has a socket 75 adapted to receive the section 72 of the clutch. The clutch member is keyed to the shaft 68 slidable thereon so that when the arm 76 is oscillated, it will move the sections 71 and 72 into engagement with the sockets of the respective gears 64 and 63. At this time the revolving gear will cause rotation of the clutch member 67 and likewise the shaft 68 in a direction dependent upon the gear which causes rotation of said clutch member.

Referring more particularly to Figure 5, the mechanism enclosed in the housing 66 is similar in all respects to the mechanism enclosed in the housing 11 and includes a shifting rod 40ª, having depending arms 42 and 43 adapted to be engaged by a rectilinearly movable and rotating screw 24 which is adapted to carry with it the platform 32, which in turn drags the wiper 35 over the windshield.

Within the housing 65 an extension 80 of the rod 40ª is located and has a fork 76 received within the slot 73 of the clutch member 67 so that as the rod 40ª is reciprocated said clutch member will be moved and will be forced into engagement with the sockets in either of the gears 63 or 64 as the case may be.

The housing 66 has an extension 81 to form a channel 82 to receive the rod 40ª and the forks 83 on the arms 42 and 43 embrace the shaft 15ª and engage over the key 28. In this manner the rod is maintained against movement except longitudinally of the housing 66. It will be noted that the slot 82 opens into a slot 84 in the sleeve 23 at the opposite end of the sleeves, so that the arms 42 and 43 may move through the slot during reciprocation of the rod 40ª.

Referring more particularly to Figure 9, it will be seen that a modified form of the clutch mechanism is provided and in which two friction disks 90 and 91 are slidably mounted on a shaft 92 having a key 93 which engages cooperating grooves in the disks 90 and 91 and the shaft whereby the disks will cause rotation of the shaft 92. These disks are actuated by means of a central member 94 which when shifting by means of a yoke 95 carried by an extension of the rod 40ª shown in Figure 5, will move the disk 90 and 91 in opposite directions on the shaft to engage a rotating disk 96 driven by a shaft 97 which in turn is revolved by a motor. A second key 98 is seated within cooperating grooves in a sleeve 99 and the member 94.

Another form of the changed speed gearing is shown in Figures 11 and 12, and in which a bearing of cone-shaped friction members 100 and 101 are slidably mounted on a shaft 102, and a key 103 which connects the cone-shaped members to the shaft for simultaneous rotation. A cone-shaped member 104 driven by a shaft 105 is adapted to engage either the cones 100 or 101 depending upon whether the connecting member 106 is moved to the right or left, whereby the rotation of the shaft 102 is changed. The member 106 is provided with a groove 107 adapted to receive the fork 76 at one end of the reciprocating rod 40ª so that as the rod is reciprocated, the unitary structure of the cones 100 and 101 are likewise moved in alternating engagement with the cone 104.

Instead of connecting the motor the screw for directly driving the screw, a flexible shafting may be employed between a moving part of the engine or vehicle for causing rotation of the screw.

Any form of coupling, well known in the art may be used for connecting the motor or flexible shafting to the screw.

In the case of an electric motor, the source of current is obtained from the battery of the automobile and controlled by a switch in the usual manner.

The operation of the device shown in Figures 5 to 12 inclusive is as follows:

When the shaft 15ª is revolved the nut 24 is revolved in the same direction and since it is in mesh with the internal threads of the fixed sleeve 23, the nut will be moved longitudinally of the housing 66. At this time the blocks 29 are carried in the same direction until the block engages either the arm 42 or 43. The continued movement of the nut in one direction will cause the arm 42 to be moved to the left, shifting the clutch member 67 in the same direction and forcing it into engagement with the socket 74 of the gear 64. At this time gear 64 will cause rotation of the clutch member and likewise the shaft 15ª thereby reversing the rotation of said shaft. When the nut 24 moves to the right, it will force the arm 43 in the same direction, causing shifting of the rod 40ª and forcing the clutch member 67 or the section 72 of the said clutch member into engagement with the socket 75 of the gear 63, whereby the gear will rotate the clutch member and likewise the shaft 15ª in the opposite direction, causing a reversed rectilinear motion of the nut 24, and likewise a reversed movement of the wiper.

The modified forms shown in Figures 9 to 12 inclusive are actuated in the same manner and either the disk 90 or 91 are shifted to engage the friction disk 96 to cause rotation of the shaft 92 in one direction, or a reverse rotation of said shaft or the cones 100 and 101 are likewise oscillated by the rod 40ª for engagement with the driven cone 104.

Having thus described the invention, what is claimed as new is:

1. In an operating mechanism for windshield wipers, a driven shaft, means for causing rotation of said shaft, an internally threaded stationary sleeve, a movable externally threaded nut meshing with the threads of the sleeve, means connecting the nut for simultaneous rotation with the shaft while permitting longitudinal movement of the nut on the shaft, means adapted to be actuated by the nut for causing a reverse rotation of the shaft, said sleeve being provided with a longitudinal slot, a collar at each end of the nut, and provided with a lug projecting through the slot, a carrier connecting the lugs of the collars.

2. In an operating mechanism for windshield wipers, a driven shaft, means for causing rotation of said shaft, an internally threaded stationary sleeve, an externally threaded nut meshing with the threads of the sleeve, means connecting the nut for simultaneous rotation with the shaft while permitting longitudinal movement of the nut on the shaft, means adapted to be actuated by the nut for causing a reverse rotation of the shaft, a track, a carrier driven by said nut, means projecting in the track and adapted to be moved longitudinally of the shaft by the nut, said last mentioned means being connected to the carrier.

3. In an operating mechanism for windshield wipers, a driven shaft, means for causing rotation of said shaft, an internally threaded stationary sleeve, an externally threaded nut meshing with the threads of the sleeve, means connecting the nut for simultaneous rotation with the shaft while permitting longitudinal movement of the nut on the shaft, means adapted to be actuated by the nut for causing a reverse rotation of the shaft, said sleeve being provided with a longitudinal slot, lugs projecting through the slot, each lug having means slidably mounted on the shaft and engaging an end of the nut, a carrier secured to the lugs and located externally of the sleeve.

4. In an operating mechanism for windshield wipers, a shaft, a motor for causing rotation of said shaft, an internally threaded stationary sleeve, an externally threaded nut meshing with the thread of the sleeve, means for connecting the nut for simultaneous rotation with the shaft while permitting longitudinal movement of the nut on the shaft, a carrier adapted to be moved by the nut, a rod adapted to be actuated by the nut in opposite directions and provided with a switch element, a pair of switch blades adapted to be alternately engaged by the switch element on the rod for reversing the circuit of the motor, and wires connected with the switch blades and with the fields of the motor.

In testimony whereof I affix my signature.

JOSEPH BORNSTEIN.